Patented Nov. 23, 1948

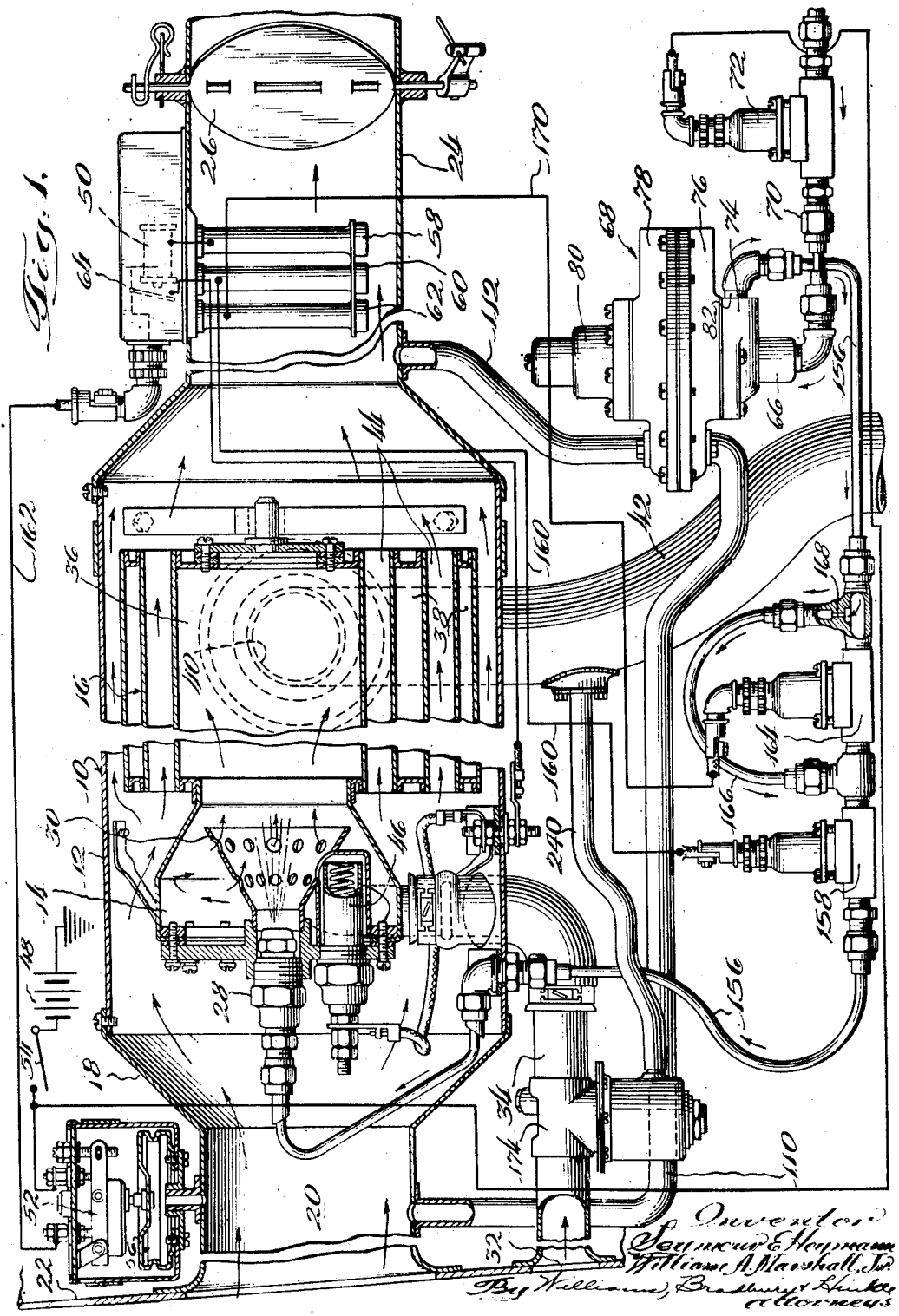

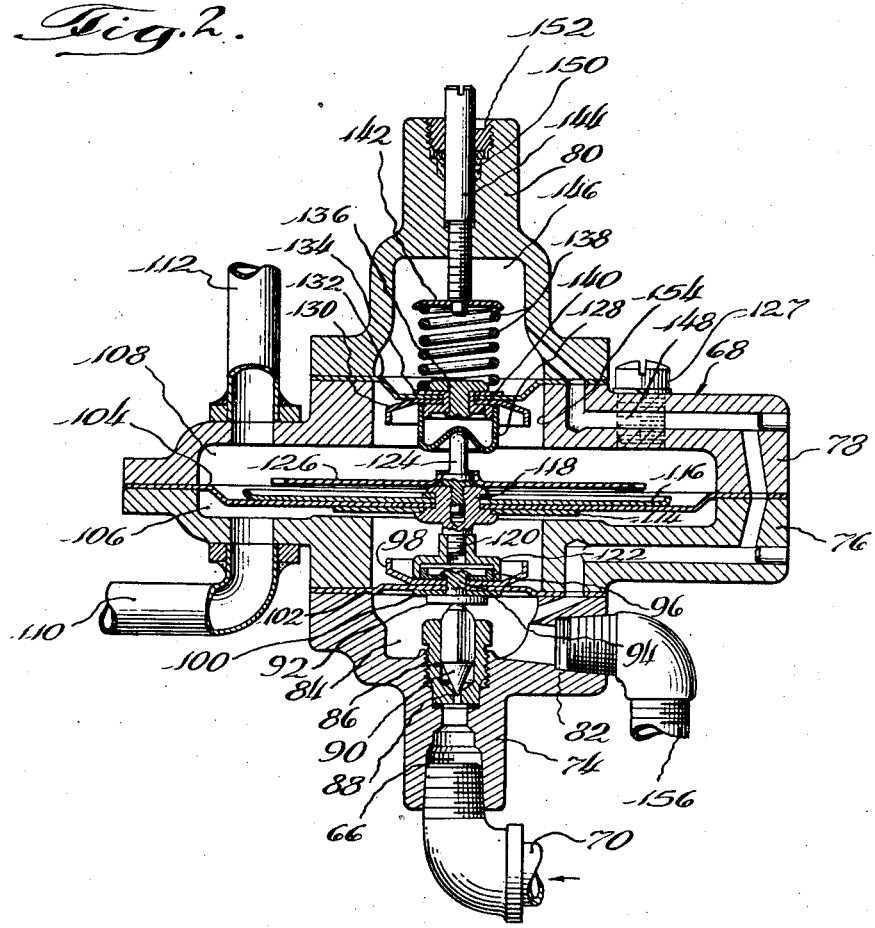

2,454,511

UNITED STATES PATENT OFFICE 2,454,511

COMBUSTION AIR HEATER HAVING VARIABLE OUTPUT WITH CONSTANT TEMPERATURE

Seymour E. Heymann, Evanston, and William A. Marshall, Jr., Chicago, Ill., assignors to Stewart-Warner Corporation, a corporation of Virginia Application April 13, 1944, Serial No. 530,788

2 Claims. (Cl. 126—110)

Our invention relates to controls for heating systems and more particularly to controls for the internal combustion heating systems used in aircraft.

An object of our invention is to provide a new and improved control for internal combustion heating systems of aircraft to make such heating systems respond more precisely and quickly to variations in the heating needs of the aircraft.

Another object of our invention is to provide a new and improved control for internal combustion heating systems which will permit such heating systems to respond more readily and efficiently to varying heat requirements.

Another object of our invention is to provide a new and more flexible control which is inexpensive to manufacture and install and which will afford long and trouble-free service.

Other objects and advantages will become apparent as the description proceeds.

In the drawings:

Fig. 1 is a view of a heating system embodying a preferred form of our invention and showing the heater and certain other parts in section for clearer disclosure of details of construction; and Fig. 2 is an enlarged, sectional view of the pressure responsive valve.

In Fig. 1, we have illustrated a heating system comprising an internal combustion heater 10 having a casing 12 enclosing a combustion chamber 14 and a heat exchanger 16. The lefthand end of the casing 12 is connected to a ventilating air pipe 18 which is supplied with ventilating air by a ram 20 located in a forward wall 22 of a part of an aircraft structure. The ventilating air supplied by the ram 20 flows around the walls of the combustion chamber 14 and through the heat exchanger 16 and absorbs heat therefrom. The heated ventilating air passes from the righthand end of the casing 12 into a ventilating air duct 24 leading to a cabin or other space or spaces to be heated. The duct 24 is illustrated as being provided with a ventilating air control valve 26, which may be manually or automatically operated to vary the quantity of ventilating air delivered by the heating system to the space or spaces receiving such air.

In aircraft practice, it is desirable to maintain the temperature of the heated ventilating air substantially constant and since the rate of air flow through the heater varies with different positions of the valve 26, the heat output requirements of the heater vary greatly with different positions of this ventilating air control valve. Our novel control is designed to regulate the operation of the heater so that the heat output of the heater corresponds closely at all times to the heat requirements of the ventilating air flowing through the heater.

In the heater shown in Fig. 1, the fuel consumed in the combustion chamber is delivered to this chamber by a nozzle 28 threaded into an end wall of the combustion chamber. This nozzle delivers the fuel in the form of a conical spray coaxial with a sheet metal cone 30 extending into the combustion chamber and secured to the aforesaid end wall thereof. The combustion air is supplied to the combustion chamber 14 by a combustion air ram 32 which is connected to the combustion chamber by a combustion air pipe 34. The cone 30 is perforated, as clearly shown in Fig. 1, so that part of the air delivered to the combustion chamber can flow through the perforations in this cone to mix with the fuel delivered by the nozzle 28, whereas the remainder of the combustion air flows around the end of the cone 30 to mix with the unburned fuel.

The products of combustion created in the combustion chamber flow into the central passage 36 of the heat exchanger 16 and thence through a spiral passage 38 to an outlet 40 connected to an exhaust pipe 42 through which the cooled products of combustion are discharged to atmosphere. The heat exchanger 16 has ventilating air passages 44 and the walls separating the passages 44 from the central passage 36 and spiral passage 38 are of thin metal to facilitate the transfer of heat from the hot products of combustion to the ventilating air.

The mixture of fuel and air formed in the combustion chamber is ignited by an electrical igniter 46 which is illustrated as being in the form of a plug threaded into the end wall of the combustion chamber. This electrical igniter is supplied with current from a battery 48, or other suitable source of electrical energy and means is provided to disconnect the igniter 46 from its source of current after the heater attains normal operation. Means is also provided to prevent the igniter from initiating heater operation when the air pressure at the ram 20 is insufficient to create a proper flow of ventilating air through the heater.

The igniter 46 is connected with the battery 48 by a circuit including a relay 50, a ventilating air pressure responsive switch 52, and a manual switch 54, which is the master switch for starting and stopping heater operation. The ventilating air pressure responsive switch 52 is biased toward open position and is held closed by a diaphragm 56 only so long as the pressure in the ventilating air pipe 18 is sufficient to create an adequate flow of ventilating air through the heater. If at the time the manual switch 54 is closed to initiate heater operation, the ram 20 is not creating sufficient ventilating air pressure to afford adequate flow through the heater, the switch 52 will remain open and the igniter 46 will be cut off from the battery 48 and will, therefore, be unable to initiate heater operation.

Referring again to Fig. 4, it will be seen that the relay 50 is controlled by a thermostatic switch 58 located in the ventilating air duct 24. The switch 58 is normally closed and opens only when the temperature of the ventilating air in the duct 24 reaches a predetermined value, at which time this switch breaks the circuit to the relay 50, which in turn opens the circuit to the igniter 46. The thermostatic switch 58 and two similar switches 60 and 62 are unitary with a box 64 containing the relay 50 and adapted for attachment to a wall of the duct 24 in such manner that the three thermostatic switches project into the duct through a slot in the wall thereof. Gasoline or other suitable fuel for the heater is delivered to the inlet 66 of a flow control valve 68 by a pipe 70 connected to a source of fuel under constant pressure. A solenoid shut-off valve 72 is located in the pipe 70 and serves to prevent all flow of gasoline to the carburetor 68 except when the master switch 54 is closed.

This pressure responsive valve is best shown in Fig. 2 and comprises a base casting 74, a pair of intermediate castings 76 and 78, and an upper casting 80 secured together by screws (not shown) or in any other suitable manner. The base casting 74 provides a fuel inlet 66 and a fuel outlet 82 connected through a valve chamber 84. A nipple 86 is threaded into the casting 74 and provides a valve seat 88 adapted to be engaged by the conical lower end of a valve member 90. This valve member is reciprocally mounted in the nipple 86 and the largest portion of this valve member is preferably triangular, as shown, to permit flow of fuel therepast.

The valve member 90 is moved upwardly by the difference in fuel pressure between the inlet 66 and outlet 82 and is urged towards closed position by the force exerted thereon by a pressure plate 92. The pressure plate 92 has a rivet-like extension 94 whose upper end is clamped over a disc 96. A tapered cup 98 and a second disc 100 are confined between the head of the pressure plate 92 and the discs 96 and the central portion of a flexible diaphragm 102 is clamped between the cup 98 and disc 100. The periphery of this diaphragm is clamped between base casting 74 and intermediate casting 76. The diaphragm may be of metal or fabric coated or impregnated with synthetic rubber or other suitable material.

A second flexible diaphragm 104 has its periphery clamped between intermediate castings 76 and 78 and cooperates with these castings to form a variable lower chamber 106 and a variable upper chamber 108 on opposite sides of the diaphragm 104. A pipe 110 connects the lower chamber 106 with the ventilating air ram 20 and a pipe 112 connects the upper chamber 108 with the ventilating air outlet duct 24 so that the differential pressure across the diaphragm 104 reflects the ventilating air drop across the heater. The central portion of the diaphragm 104 is reinforced by discs 114 and 116 located on opposite sides thereof. These discs are attached to a hub 118 having a depending screw 120 carrying a foot 122 provided with a cylindrical lower end which presses against the base of the cup 98 and surrounds the disc 96 to maintain proper alignment of this disc with the hub 118.

The hub 118 has a threaded central bore therein which rotatably receives the threaded lower end of a pin 124 carrying an adjusting plate 126 whose outer edge is notched so that the plate and pin can be rotated by engaging the notched edge of the plate by a screw driver or other suitable tool, to thereby screw the pin 124 into or out of the hub 118. The screw driver may be inserted by unscrewing a plug 127 which normally closes an opening provided for this purpose.

The upper end of the pin 124 is rounded, as clearly shown in Fig. 5, and fits into a recess provided in the base of a sheet metal cup 128 whose upper end engages dished plate 130 forming a reinforcement for the central portion of a third diaphragm 132. A second reinforcement plate 134 is located on the opposite side of this diaphragm, and these plates are secured to the diaphragm by a rivet 136 having an enlarged head forming a guide for a light spring 138. The rivet 136 also secures in place a guide 140 located in the upper end of the cup 128 and maintaining this cup in axial alignment with the rivet 136.

The upper end of the spring 138 rests against a washer 142 carried by a screw 144 threaded into the upper casting 80 and adjustable to vary the tension of the spring 138. The chamber 146 formed above the upper diaphragm 132 is connected to the valve chamber 84 by a duct 148 extending through the several castings and appropriate openings in the diaphragms clamped therebetween. This conduit conducts fuel to the upper chamber 146 so that the pressure responsive valve is balanced with respect to the fuel pressure in the chamber 84 and pipe leading to nozzle 28, provided the upper diaphragm 132 and lower diaphragm 102 have the same effective area and are otherwise equivalents. In order to prevent leakage of fuel around the screw 144, packing 150 is provided to form a seal between the screw 144 and casting 80, and a nut 152 is provided to hold this packing firmly in place.

From the foregoing description of the pressure responsive valve, it will be apparent that the spring 138 exerts a downward pressure which urges the valve member 90 toward the closed position. This spring is relatively light, and its sole function is to hold the valve member 90 in closed position when the heater is not operating and thus prevent flow of fuel to the nozzle 28. When there is sufficient flow of ventilating air through the heater for proper operation of this heater, the pressure drop across the diaphragm 104 will be sufficient to overcome the spring 138 and permit valve member 90 to open. This valve member 90 is so designed that it provides a graduated flow of fuel to the nozzle 28, depending upon the extent to which this valve member has moved away from the valve seat 88. Such movement of the valve member 90 is accurately controlled by the pressure differential across the diaphragm 104. This pressure differential in turn reflects the flow of ventilating air through the heater and, therefore, the proper heat output. In this manner the fuel flow to the nozzle 28 is adjusted at all times to the heat requirements of the installation to provide proper and efficient operation.

The three diaphragms of the pressure responsive valve may be formed of the same or different materials. As previously pointed out, the pressure in the fuel chamber 84 will have no effect on the position of the valve member 90 when the lower diaphragm 102 and the upper diaphragm 132 have the same effective diameter and are otherwise identical or full equivalents. We have found it desirable, however, to provide these diaphragms with slightly different effective areas and slightly different operating characteristics in order to provide the most advantageous regulation of the fuel supplied to the nozzle 28. We have, accordingly, made the bore 154 in the intermediate casting 78 slightly larger than the corresponding bore in the casting 76 so that the maximum effective area of the upper diaphragm 132 is greater than that of the lower diaphragm 102. In the particular pressure responsive valve shown, this difference in diameter amounts to one-sixteenth ($\frac{1}{16}$) of an inch, but this figure is to be considered illustrative only as other sizes of bores may be utilized in other installations. The upper diaphragm is also preferably under tension so that the effective area of this diaphragm decreases as the central portion of the diaphragm moves downwardly, whereas the lower diaphragm is preferably free from such tension.

The valve chamber 84 of the pressure responsive valve is connected to the nozzle 28 by a pipe line 156 containing a solenoid shut-off valve 158. This shut-off valve is connected by an electrical conductor 160 to one contact of a thermostatic switch 60. The other contact of this switch is connected to the battery 48 through electrical conductor 162, ventilating air pressure switch 52 and manual switch 54. The thermostatic switch 60 is normally closed and opens only when the ventilating air in the duct 24 reaches an abnormally high termperature. Opening of this switch closes valve 158 and cuts off the fuel supply to the nozzle 28.

We have also illustrated our heating system as having a two-level operation control comprising a third solenoid valve 164 located in the fuel pipe 156 and a bypass 166 around this valve. The bypass 166 has a restriction 168 therein which permits only limited fuel flow through the bypass so that when the valve 164 is closed, the heater can operate at only partial output. On the other hand, when the valve 164 is open, maximum flow of fuel may occur through this valve.

The two-level control valve 164 is connected by a conductor 170 to the thermostatic switch 62, which is normally closed, and which connects this valve to the battery 48 through conductor 162, ventilating air pressure switch 52 and manual switch 54. The thermostatic switch 62 is set to open before the opening of the thermostatic switch 60 so that upon rise of temperature of the ventilating air the two-level valve 164 will close before the shut-off valve 158 closes, and the latter valve will not close if closing of the two-level valve 164 reduces heater operation sufficiently to prevent overheating of the ventilating air flowing through the heater.

Our new and improved heater may be utilized to heat the cabin of an aircraft, or any other enclosed space of the aircraft, or the wings of the aircraft, to prevent ice formation thereon, or for other general purposes. Except to the extent that the ventilating air flow through the heater is regulated by the valve 26 in the hot air outlet duct 24, the rate of ventilating air flow through the heater will vary with variations in speed of the aircraft. Where little ventilating air is flowing through the heater due either to the position of the ventilating air control valve 26 or to the low air speed of the aircraft, the pressure drop across the pressure responsive valve 68 is low and less fuel is delivered to the combustion chamber, so that the heater produces no more heat than is necessary to raise the volume of ventilating air flowing thereover to the desired temperature. As the flow of ventilating air through the heater increases, due either to an increase of speed of the aircraft or to opening of the valve 26, additional fuel will be supplied to the nozzle so that the heat output will be increased sufficiently to raise the increased volume of ventilating air to the desired temperature.

Where our new and improved heater is utilized to supply heat to the wing of an aircraft to prevent ice formation thereon, the heat requirements of the wing increase with increases in air speed of the aircraft. Such increases in air speed will produce increased flow of air through the ventilating air ram 20 and combustion air ram 32 and produce an increased drop across the pressure responsive valve 68 to provide a proportional increase in fuel supply to the nozzle 28. The heat output of the heater will, therefore, increase with the increase in flow of ventilating air through the heater so that the temperature of the ventilating air delivered by the heater does not decrease with an increase of the aircraft speed. The foregoing is true, however, only up to the point where the pressure responsive valve 68 attains wide open position.

In the usual installation in which the heater furnishes hot air to prevent icing of the aircraft wings, the heater attains maximum heat output only when the aircraft attains maximum air speed, so that the temperature of the air delivered to the wings of the aircraft for de-icing purposes has a constant temperature but varying volume throughout all conditions of operation. Where, however, the aircraft is designed to operate at excessively high speeds for short periods of time, as, for example, in a dive in which the aircraft attains a speed far in excess of its normal operating speeds on level flight, it is impracticable to provide a heater of sufficient capacity to heat the ventilating air to the desired temperature during such a dive. Since the rate of delivery of both the ventilating air and the combustion air increases with the air speed of the aircraft, it is desirable to provide means to prevent further increase in delivery of combustion air when the heater attains maximum heat output. In the present instance, this function is served by a combustion air control valve 174 which restricts the rate of flow therethrough if the rate tends to become excessive.

The pressure responsive valve illustrated and described herein is claimed in the co-pending application of John H. Leslie, II, Serial No. 512,791, filed December 3, 1943, now Patent No. 2,446,051 granted July 27, 1948, and assigned to the same assignee.

From the foregoing, it will be apparent that we have provided a heating system having improved, inexpensive, and reliable controls, whereby the heater operates efficiently under all variations of heat requirements, and wherein such efficient operation is automatically provided. While we have illustrated and described in detail only a single embodiment of our invention, it is to be understood that our invention is not limited to the particular details shown and described, but may assume numerous other forms and that our invention includes all modifications, variations and equivalents coming within the appended claims.

We claim:

1. A heating apparatus of the class described, comprising a heater having a combustion chamber and a heat exchanger, said heat exchanger having inlet and outlet ventilating air connections, a ram which supplies ventilating air to said heat exchanger inlet at a variable rate and at variable pressure, a nozzle for supplying fuel to said combustion chamber, a source of fuel under constant pressure, fuel regulating means connecting said source with said nozzle to increase or decrease the flow of fuel to said combustion chamber in proportion to increases or decreases in the pressure drop of the ventilating air across said heat exchanger, said regulating means including a sealed diaphragm chamber, diaphragm means in said chamber, means forming static pressure connections at the inlet and outlet connections of said heat exchanger, and conduit means connected for establishing communication between the space in said chamber on opposite sides of said diaphragm and the inlet and outlet static pressure connections of said heat exchanger, and valve means located at the outlet end of the heat exchanger and adjustable at will to vary the flow of ventilating air through said heat exchanger.

2. A heating apparatus of the class described, comprising a heater having a combustion chamber and a heat exchanger, said heat exchanger having ventilating air inlet and outlet connections, a ram which supplies ventilating air to said heat exchanger inlet connection at a varying rate and at varying pressure, a nozzle for supplying fuel to said combustion chamber, a source of fuel under constant pressure, modulating means connecting said source with said nozzle to increase or decrease the flow of fuel to said combustion chamber in proportion to increases or decreases in the pressure drop of the ventilating air across said heat exchanger, said modulating means including a sealed diaphragm chamber, diaphragm means in said chamber, means forming static pressure taps at said inlet and outlet connections, and conduit means for establishing communication between the spaces in said diaphragm chamber on opposite sides of said diaphragm and the inlet and outlet static pressure taps of said heat exchanger, and a manually controlled valve for varying the flow of ventilating air through said heat exchanger.

SEYMOUR E. HEYMANN.
WILLIAM A. MARSHALL, JR.

REFERENCES CITED

The following references are of record in the file of this patent:

UNITED STATES PATENTS

| Number | Name | Date |
|---|---|---|
| Re. 16,796 | Keith | Nov. 22, 1927 |
| 987,732 | Gerdes | Sept. 1, 1908 |
| 1,583,238 | Scudder | May 4, 1926 |
| 1,919,413 | Buck | July 25, 1933 |
| 1,958,913 | Coriolis et al. | May 15, 1934 |
| 2,381,358 | Marshall | Aug. 7, 1945 |
| 2,403,186 | Leslie | July 2, 1946 |
| 2,429,101 | Leslie | Oct. 14, 1947 |